United States Patent [19]

Schmidberger et al.

[11] Patent Number: 4,762,020
[45] Date of Patent: Aug. 9, 1988

[54] LINK-TYPE APRON ARRANGEMENT

[75] Inventors: Peter Schmidberger, Münchner Str. 104, D-8043 Unterföhring; Herbert Kowal, Lohhof, both of Fed. Rep. of Germany

[73] Assignee: Peter Schmidberger, Fed. Rep. of Germany

[21] Appl. No.: 71,541

[22] Filed: Jul. 7, 1987

Related U.S. Application Data

[63] Continuation of Ser. No. 256,276, Apr. 23, 1981, abandoned.

[30] Foreign Application Priority Data

May 30, 1980 [DE] Fed. Rep. of Germany ....... 3020621

[51] Int. Cl.[4] .................. F16P 1/00; G05G 25/00; E06B 3/12
[52] U.S. Cl. .................. 74/612; 160/231.2; 24/703; 403/220
[58] Field of Search ............. 74/608, 612; 24/201 C, 24/201 A; 403/220, 219, 50, 291; 256/26; 52/71; 160/231 A

[56] References Cited

U.S. PATENT DOCUMENTS

| | | |
|---|---|---|
| 3,074,520 | 1/1963 | Gruiebich .................. 24/201 C |
| 3,326,268 | 6/1967 | Dixon .................. 160/231 A |
| 3,460,860 | 8/1969 | Stevens, Jr. .................. 52/71 |
| 4,027,714 | 6/1977 | Dixon et al. .................. 160/231 A |

FOREIGN PATENT DOCUMENTS

| | | |
|---|---|---|
| 942431 | 5/1956 | Fed. Rep. of Germany . |
| 2462091 | 3/1976 | Fed. Rep. of Germany . |
| 515835 | 1/1972 | Switzerland . |
| 1036046 | 7/1966 | United Kingdom . |
| 1226844 | 3/1971 | United Kingdom . |
| 1329420 | 7/1973 | United Kingdom . |

Primary Examiner—Gary L. Smith
Assistant Examiner—Vinh Luong
Attorney, Agent, or Firm—Jim Zegeer

[57] ABSTRACT

In a linked bar member-type apron arrangement for protecting guide tracks, drive assemblies, positions which are liable to accident, or the like, in machine tools or the like, the bar or plate members are each connected together by individual bendable elements which are each secured to the two adjoining plate or bar members. The fixing is preferably made by form-lockingly connecting the bar members to the bendable elements. The bar members preferably comprise extruded aluminium members and the bendable elements preferably comprise extruded polyurethane members. The apron arrangement is easy and inexpensive to produce, extremely durable, easy to handle and highly bendable.

10 Claims, 1 Drawing Sheet

GUIDE TRACKS AND DRIVE ASSEMBLIES MACHINE TOOL

LINK-TYPE APRON ARRANGEMENT

This application is a continuation of application Ser. No. 256,276, filed Apr. 23, 1981, now abandoned.

FIELD OF THE INVENTION

The invention relates to a link-type apron arrangement for protecting guide tracks, drive assemblies, locations which are liable to cause accidents, or the like, in machine tools or the like, comprising individual interconnected bar members which are bendable relative to each other.

BACKGROUND OF THE INVENTION AND PRIOR ART

In a known link-type apron arrangement of this kind, shaped metal members are mounted by rivetting to the top side and the bottom side of a polyester fabric. The known link-type apron arrangement is of high inherent weight and therefore has unsatisfactory sliding properties. In addition, the production of the known link-type apron arrangement is a time-consuming and expensive process.

In another known link-type apron arrangement, half-round plate or bar members of light metal or alloy are mounted by adhesive to a polyurethanised plastics fabric and partially rivetted to the outer edges, in order to give an improved service life. As the adhesive connection cannot be definitively controlled, there are major uncertainties in regard to adhesion of the plate or bar members to the plastics fabric. The production process is also comparatively complicated and liable to trouble. Finally, these apron arrangements have only a limited service life as heavy chippings or aggressive fluids can get behind the adhesive.

In yet another known link-type apron arrangement of the above-indicated kind, anodised aluminium plate or bar members are joined together in a hinged manner by virtue of their particular configuration, and are screwed at the outer end surfaces in order to ensure that the components are held together. This results in the plate or bar members being of an unwieldy minimum size, with the apron arrangement consequently having a low degree of bendability. This known apron arrangement can therefore only be used in limited circumstances. In addition, the hinge means are very sensitive to fouling, and this can involve trouble in operation of the arrangement.

OBJECT OF THE INVENTION

The present invention is therefore based on the problem of overcoming the shortcomings of the known link-type apron arrangements and providing a link-type apron arrangement with a bar member-type construction, which can be produced in an inexpensive and simple manner, which has a very good service life, which can be easily operated and which is very bendable.

SUMMARY OF THE INVENTION

In a link-type apron arrangement of the above-indicated kind, this problem is solved in accordance with the invention in that the bar members are each connected together by respective individual bendable elements which are respectively secured to the two adjoining bar members.

Preferably, the plate or bar members and the bendable connecting elements are form-lockingly or positively connected together, while the plate or bar members preferably comprise shaped members with recesses which extend longitudinally on both sides thereof, and the connecting elements preferably comprise shaped members with enlarged portions which extend longitudinally on both sides thereof and which correspond to the recesses. In this arrangement, the bar members preferably comprise light metal or alloy members, for example aluminium members, and the connecting elements preferably comprise plastics members, for example polyurethane members. The link-type apron arrangement according to the invention, which comprises only two different components, each of which can be easily produced, can be readily fitted, in particular also providing for compensation in respect of manufacturing tolerances, insofar as, in accordance with the invention, the recesses in the bar members are first opened in a beak-like manner, for example downwardly, through an angle of about 10° to 15°, the enlarged portions of the bendable members forming the connecting elements are inserted into the adjoining recesses in the bar members, and the recesses are then pressed together in order to formlockingly and fixedly connect the bar members to the flexible connecting elements.

The link-type apron arrangement is also extremely durable as there is only an extremely low degree of friction involved and the area which can be attacked by environmental factors such as chips or shavings, aggressive fluids or the like, in the connecting region between the bar members, which is for example only 0.5 mm in width, is reduced to a negligible minimum. Finally, the link-type apron arrangement according to the invention can be easily handled and is extremely bendable as in particular the width of the bar members is not subjected to any requirements in regard to minimum design sizes.

In a particularly desirable embodiment of the link-type apron arangement according to the invention, which permits the bar members and the connecting elements advantageously to be produced by an extrusion process, the recesses in the bar members are of a cylindrical configuration and open to the narrow sides of the bar members by way of tapering slots, and the enlarged portions of the members forming the connecting elements are connected by way of tapering web portions to a central flexible section of thin wall thickness which is for example 0.5 mm in thickness.

In accordance with another advantageous embodiment of the link-type apron arrangement according to the invention, the bar members are of a receding configuration at their bottom lateral edges, while the bar members are flattened on the bottom broad side and are of a convex configuration on the top broad side. This configuration of the bar members, in conjunction with the upwardly open connecting region of the connecting elements being for example 0.5 mm in width, on the one hand permits the bar members to pivot downwardly through 90° and more, with the connecting elements being subjected to a substantially pure bending loading, without the bar members striking against each other. The service life of the connecting elements is considerably increased by virtue of their being subjected to a substantially pure bending loading. On the other hand, the bar members have only a very limited capacity for pivotal movement in an upward direction as the bar members bear against each other after just a small amount of pivotal movement, this effect being further promoted by a short vertical web portion at the top lateral edges of the convex top broad side. This design also gives the apron arrangement a sufficient degree of rigidity which permits horizontal and vertical movement of the link-type apron arrangement without lateral guide means.

Further advantages, features and possible uses of the present invention are to be found in the following description of a preferred but non-limitative example and the accompanying drawing made a part hereof and to which reference is made:

BRIEF DESCRIPTION OF THE DRAWINGS

FIG. 1 shows a bar member 1 having cylindrical recesses 2 and 3 which open to the two narrow sides of the member 1, by way of tapering slots 4 and 5. Tooth-like ribs 14 are provided for example in the bottom region of the slots 4 and 5. The top side 6 of the member 1 is of a convexly curved configuration, with vertical web portions 6a and 6b at the top lateral edges. The underside 7 of the member 1 is of a rectilinearly flattened configuration, with a receding configuration at the bottom lateral edges 7a and 7b. The member 1 comprises for example aluminium, while practical dimensions of the member approximately correspond to a fifth of the dimensions shown in FIG. 1.

FIG. 2 shows a bendable member forming a connecting element 8, with cylindrical enlarged portions 9 and 10 which are disposed at the narrow sides thereof. The enlarged portions 9 and 10 substantially correspond in respect of their dimensions to the recesses 3 and 2 and are connected by way of tapering web portions 12 and 13 to a central, highly bendable section 11 ( see in particular FIG. 3) of the member 8, which is of thin wall thickness, for example 0.5 mm. The member 8 preferably comprises plastics material of high tearing strength, for example polyurethane, and practical dimensions of the member 8 approximately correspond to a fifth of the dimensions illustrated in FIG. 2.

FIG. 3 shows a link-type apron arrangement which comprises the members 1 and 8, while the two plate or bar members 1 which are shown at the right are disposed at a right angle relative to each other, and the member forming the connecting element 8, which connects the two bar members 1, is accordingly bent through an angle of about 90°, with the section 11 being subjected to a substantially pure bending loading.

Figure 1:
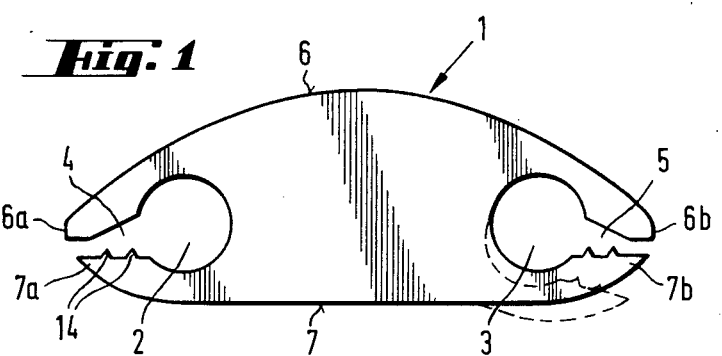
FIG. 1 shows a view in cross-section on an enlarged scale through a bar member of the link-type apron arrangement according to the invention.
Figure 2:
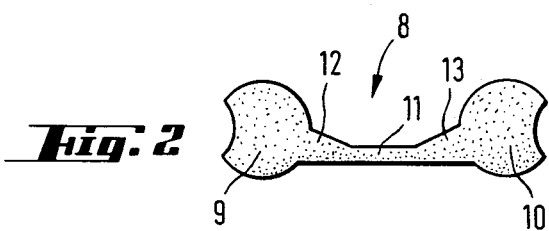
FIG. 2 shows a view in cross-section of an enlarged scale through a bendable member forming a connecting element of the link-type apron arrangement according to the invention.
Figure 3:
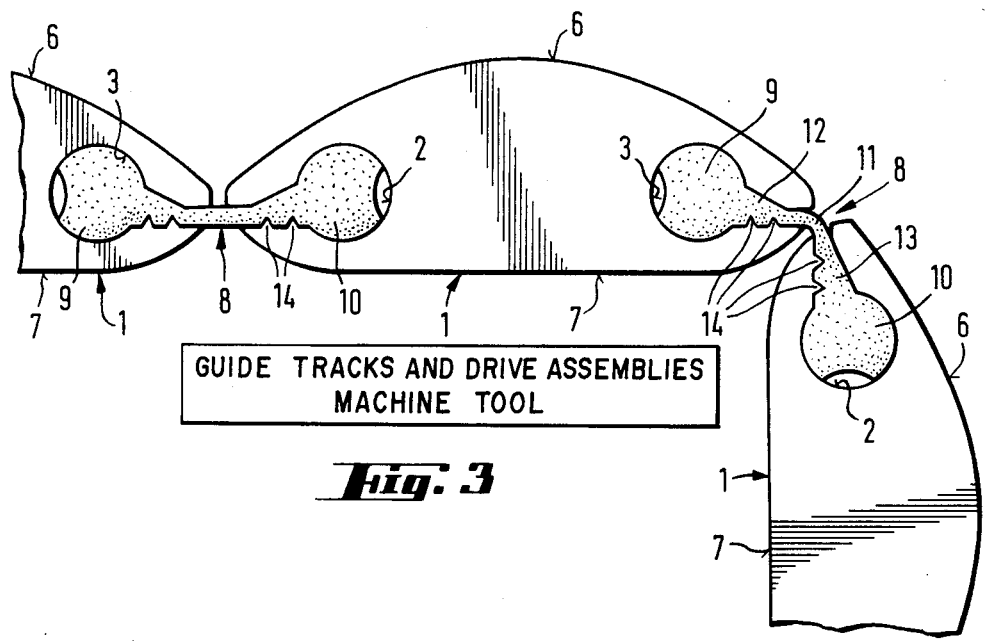
FIG. 3 shows a view in cross-section through a part of a link-type apron arrangement according to the invention.

The members 1 and 8 are assembled to form a link-type apron arrangement in the following manner: with the members 1 in an initial condition, the recesses 2 and 3 are opened in a beak-like manner downwardly through an angle for example of about 10° to 15° (shown in broken lines in respect of the recess 3 in FIG. 1). After the connecting elements 8 or the lateral enlarged portions 9 and 10 thereof are inserted into the respective adjoining opened recesses 3 and 2, the bar members 1 or the open recesses 2 and 3 are pressed together, thereby producing a fixed form-locking or positive connection to the connecting members 8 or the lateral enlarged portions 10 and 9 thereof. In order additionally to secure the connecting elements 8 in the bar members 1, the tooth-like ribs 14 engage into the web portions 12 and 13 of the connecting elements, when the recesses are compressed.

We claim:

1. Link-type apron apparatus for protecting guide tracks, drive assemblies and the like, comprising,
   (1) a plurality of extruded light weight metal bar members having tapered slots in two opposing ends thereof and parallel to the longitudinal axis thereof, each said tapered slots being defined by a pair of mutually facing wall surfaces and tapering toward said two opposing ends,
   (2) a plurality of connecting bendable plastic elements, each said plastic members having a pair of end portions with tapering sides, said tapering sides entirely engaging said pair of mutually facing wall surfaces along the length thereof in said bar members forming said tapered slots and a central bendable section between said pair of end portions, said tapering sides being complementary to said taper in said slots and being tapered toward the center of said central bendable section, and said bars having ends which are so shaped, and spaced apart by said connecting elements, such that each bar can pivot relative to an adjacent bar through at least 90 degrees in one direction with the connecting element being subjected to a substantially pure bending loading without the adjacent bar members striking each other and said adjacent bar members have a limited pivotal movement in an oppsite direction to said one direction.

2. A link-type apron arrangement according to claim 1 in which the bar members are of a receding form at their bottom lateral edges and are flattened on the bottom broad side and are of a convex configuration on the top broad side.

3. A link-type apron arrangement according to claim 1 in which tooth-like ribs are formed in one of said tapering sides in light weight metal bar members, which ribs are engaged to the members forming the connecting elements.

4. The link-type apron apparatus defined in claim 1 wherein said extruded bar members are aluminum and wherein said tapering sides have been pressed together for lockingly fixing and sealing said tapering sides to the tapered end portions of said bendable plastic elements, respectively.

5. The link-type apron apparatus defined in claim 4 wherein at least one tooth-like rib member is formed in one of said pair of mutually facing wall surfaces defining said tapered slots for lockingly fixing said bar members and said bendable plastic elements in assembly.

6. In combination with a machine tool having said guide track drive assemblies and the like, the improvement comprising the link-type apron apparatus defined in claim 1.

7. The link-type apron apparatus defined in claim 1 wherein the facing ends of each said light weight metal bar has a rounded surface.

8. The link-type apron apparatus defined in claim 7 wherein said facing ends have vertical web portion surfaces at one side of said slot, with the other wide of said slot of said sides having a receding surface configuration and said ends are spaced by said connecting elements so as to permit said light weight metal bar members to pivot more in the direction of said larger curvature without said light weight metal bar members striking against each other than in the opposite direction.

9. In combination wtih a machine tool having guide tracks and drive assemblies and locations which are liable to cause accidents, a link-type apron arrangement for protecting said guide tracks, drive assemblies, locations which are liable to cause accidents, or the like, comprising a plurality of individual rigid light metal bar members aligned side-by-side and a plurality of positively connected bendable connecting elements interconnecting said rigid bar members such that said bar members can be pivoted relative to one another, the improvement comprising, said bendable connecting elements being plastic and having end portions, means adjacent said end portions of said bendable connecting elements positively connecting said end portions to two adjacent bar members, said end portions being at least partly in the form of tapering web portions in said bendable elements, and at least partially tapering slots in opposing ends of said bar members, the taper in said slots being in the direction of the ends of said bar members and complementary to the taper in said tapering web portions so as to lock and fix said bars to said bendable connecting elements and the surfaces forming said slots entirely engaging the surfaces of said tapering web portions, respectively, and a central bendable section being formed between said two tapering web portions of said elements, each said tapering web portion tapering in the direction of said central bendable section.

10. The combination defined in claim 9 wherein said ends of said bar are shaped, and spaced apart by said connecting elements, such that each bar can pivot relative to an adjacent bar through at least 90 degrees in one direction with the connecting element being subjected to a substantially pure bending loading without the adjacent bar members striking each other and said adjacent bar members have a limited pivotal movement in an opposite direction to said one direction.

* * * * *